US006594133B1

(12) United States Patent
Schmidt et al.

(10) Patent No.: US 6,594,133 B1
(45) Date of Patent: Jul. 15, 2003

(54) SURGE ARRESTER

(75) Inventors: Walter Schmidt, Bellikon (CH); Peter Oehlschläger, Magden (CH)

(73) Assignee: ABB Schweiz AG, Baden (CH)

( * ) Notice: Subject to any disclaimer, the term of this patent is extended or adjusted under 35 U.S.C. 154(b) by 301 days.

(21) Appl. No.: 09/655,866

(22) Filed: Sep. 6, 2000

(30) Foreign Application Priority Data

Sep. 7, 1999 (DE) ........................................ 199 42 633

(51) Int. Cl.[7] ................................................ H02H 1/00
(52) U.S. Cl. ....................................... 361/117; 361/127
(58) Field of Search ................................ 361/117, 118, 361/120, 126, 127, 128, 129, 130, 131, 132

(56) References Cited

U.S. PATENT DOCUMENTS 4,029,380 A * 6/1977 Yonkers ...................... 439/95
5,517,382 A * 5/1996 Leupp et al. ............... 361/118

FOREIGN PATENT DOCUMENTS

DE 195 04 532 8/1996 ........... H01B/19/00
EP 0 443 178 8/1991 ............ H01C/7/12
EP 0 810 613 12/1997 ............ H01C/7/12

* cited by examiner

*Primary Examiner*—Ronald W. Leja
(74) *Attorney, Agent, or Firm*—Burns, Doane, Swecker & Mathis, L.L.P.

(57) ABSTRACT

The surge arrester has a cylindrically symmetrical housing which can be grounded and through which a plug connection is passed which can be brought to a high-voltage potential. An active part which is aligned along the axis of symmetry is arranged in the housing and has two connection fittings and at least one varistor element arranged between the two connection fittings. The connection fittings and the at least one varistor element are braced with respect to one another by at least one loop forming a contact force. The insulation between the active part and the housing is ensured by a dielectric sleeve. The housing is in the form of a dielectric sleeve. The housing is in the form of a bottle and has a housing section in the form of a bottle neck, in which an electrical conductor is routed, which is connected to one of the two connection fittings, is electrically conductively connected to the plug connection, and is cylindrically symmetrical.

15 Claims, 2 Drawing Sheets

SURGE ARRESTER

This application claims priority under 35 U.S.C. §§119 and/or 365 to Appln. Ser. 199 42 633.3 filed in Germany on Sep. 7, 1999; the entire content of which is hereby incorporated by reference.

FIELD OF THE INVENTION

The invention is based on a surge arrester having a cylindrically symmetrical housing which can be grounded, through which a plug connection is passed which can be brought to a high-voltage potential, and having an active part which is arranged in the housing and is aligned along the axis of symmetry and has two connection fittings, having at least one varistor element arranged between the two connection fittings, and having a tensioning apparatus which acts on the connection fittings and the at least one varistor element to form a contact force, in which surge arrester the active part is surrounded by an elastic dielectric sleeve which ensures the insulation from the housing.

BACKGROUND OF THE INVENTION

An arrester of the abovementioned type is offered by numerous manufacturers commercially and is used for the protection of metal-encapsulated, gas-insulated switchgear assemblies. The arrester is in this case connected to a system plug contact which carries high voltage and has an outer or inner cone, and then limits overvoltages which are produced by switching processes or by reflection of traveling waves. The arrester contains a housing which is kept at ground potential and is protected against direct contact, and an active part which is installed in the housing and is formed from varistor elements, particularly based on metal oxide, without any spark gaps. The active part is encased in a dielectric composed of silicone rubber, whose outer surface at least partially rests on the inner surface of the housing. Such an arrester generally has semiconductive or conductive field-control elements to control the electric field between the active part, which is at high-voltage potential, and the housing, which is kept at ground potential.

EP 0 810 613 A2 describes a surge arrester having an active part embedded in a cast housing composed of dielectric material. Two connection fittings and varistor elements of the active part are braced with respect to one another by means of a loop composed of dielectric material, forming a contact force.

SUMMARY OF THE INVENTION

In the surge arrester according to the invention, the active part is held together and has contact force applied to it by at least one loop which is mounted on its two connection fittings. This gives the active part high mechanical strength in a manner which is simple in production engineering terms and is thus cost-effective. At the same time, a housing which surrounds the active part is in the form of a bottle, and this housing has a housing section in the form of a bottle neck, in which an electrical conductor is routed which is connected to one of the two connection fittings, is electrically conductively connected to the plug connection, and is cylindrically symmetrical. This results in an electric field being formed in the interior of the housing which makes it unnecessary to have any field-controlling, semiconductive or conductive elements and coatings between the active part and the wall of the housing even if the active part is not cylindrically symmetrical as a result of the holding loop. At the same time, the surge arrester is distinguished by excellent long-term stability owing to the mechanically very strong active part and owing to the lack of any field-controlling elements.

A particularly homogeneous distribution of the electric field, and thus a particularly advantageous dielectric response of the surge arrester, are achieved if there is a conically expanding housing section adjacent to the housing section in the form of a bottle neck, in which expanding housing section an end (which is connected to one of the two connection fittings) of the electrical conductor, which is connected to the plug connection, is routed.

It is advantageous for the housing section which is in the form of a bottle neck to expand at its end facing the plug connection, since the expansion then acts as a stop for mounting elements which are guided on this housing section. Such mounting elements are advantageously a mounting flange guided on the housing section in the form of a bottle, and a compression spring arranged between the mounting flange and the expanded area.

Since increased pressures may possibly occur when any possible overloading of the surge arrester occurs, the housing, which is in the form of a bottle, is generally designed to be pressure-resistant and is provided with an overpressure valve. This overpressure valve can advantageously be arranged on the housing base or may be the base itself, provided with a weak point. When the overpressure valve responds, hot gases emerging from the housing in the form of a bottle can then be removed without any problems—and without the plug connection being damaged.

Dielectrically undesirable gaps and/or pores between the suppressor active part and a dielectric sleeve provided between the active part and the housing are avoided by coating the active part with an adhesion promoter. Pores and/or gaps which nevertheless occur in the housing interior between the active part and the housing wall are filled with a gel-like dielectric in order to improve dielectric strength.

BRIEF DESCRIPTION OF THE DRAWINGS

Preferred embodiments of the invention and the further advantage which can be achieved thereby are disclosed in the following description and illustrated in the accompanying drawings, in which.

DETAILED DESCRIPTION OF THE INVENTION

Figure 1:
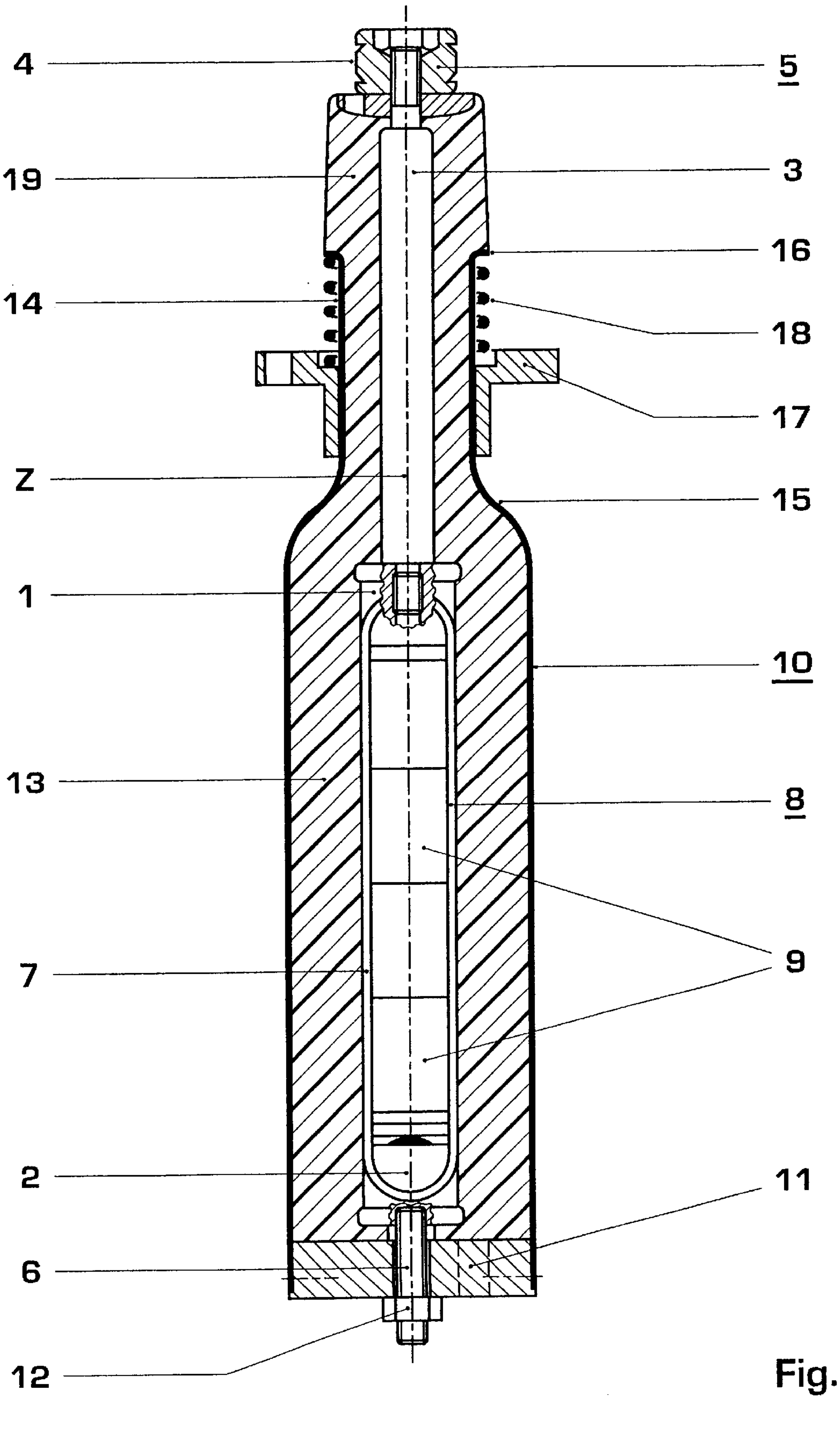
FIG. 1 shows a view of a section, along an axis, through one embodiment of the surge arrester according to the invention having a plug connection in the form of an outer cone.
Figure 2:
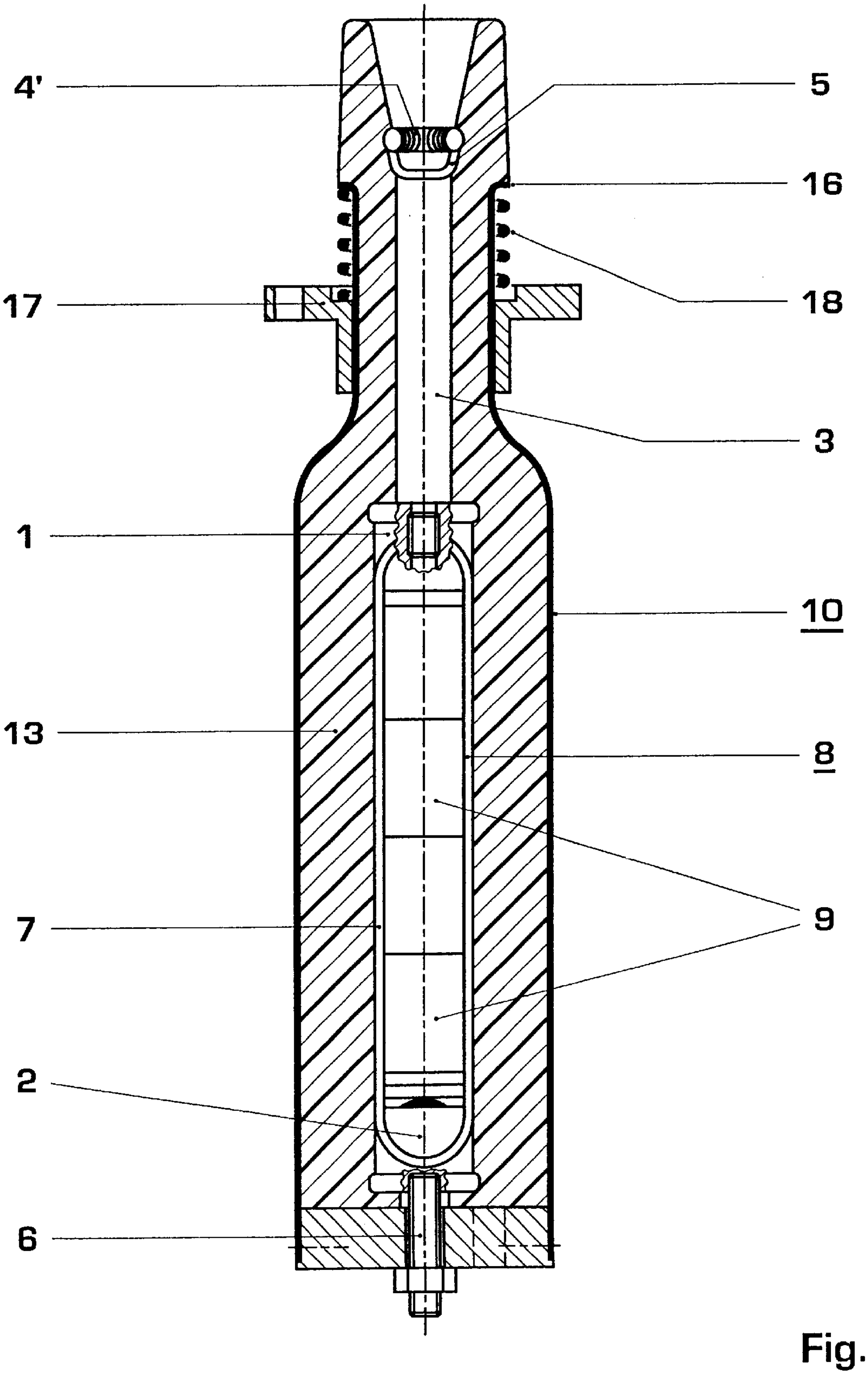
FIG. 2 shows a view of a section, along an axis, through one embodiment of the surge arrester according to the invention having a plug connection in the form of an inner cone.

In the two figures, identical reference symbols also refer to parts having the same effect. The surge arresters shown in FIGS. 1 and 2 have two connection fittings 1, 2, which are preferably composed of aluminum and are spaced apart from one another along an axis z. The connection fitting 1 is connected via an electrical conductor 3, which is cylindrically symmetrical and is routed along the axis z, to a plug connection 5 which has an outer cone 4 (FIG. 1) and an inner cone 4' (FIG. 2). This plug connection can be connected to a plug connection, which has an inner or outer cone and carries high voltage, of a metal-encapsulated, gas-insulated system. The connection fitting 2 can be connected to ground potential via a likewise axially routed electrical conductor 6. A loop 7 composed of a glass-fiber-reinforced strip embedded in a plastic matrix is mounted with its two ends in recesses or in formed areas in the connection fittings 1, 2.

Cylindrical varistor elements 9, composed of non-linear resistance material, for example based on metal oxide, in particular such as ZnO, are arranged between the connection fittings 1, 2, forming a suppressor active part 8 in the form of a column and aligned along the axis z. Alternatively, one varistor element in the form of a column may be provided instead of a plurality of elements 9. Sprung current-carrying elements, which are not shown in the figures, are arranged between the connection fittings 1, 2 and the two adjacent varistor elements 9, and between the individual varistor elements 9. The two connection fittings 1, 2 and the parts in between them have a defined stress force applied to them. This ensures good contact between the varistor elements 9 provided in the active part, and with the connection fittings 1, 2. The stress force is absorbed by the loop 7. Two, or possibly even more loops may be used to brace the active part 8, instead of one loop.

The active part 8 is arranged in a cylindrically symmetrical housing 10 which can be grounded. This housing 10 may be composed of metal, for example aluminum, of an electrically conductive polymer material, for example a polyethylene filled with conductive soot, or of a polymer material, such as polyethylene, provided with an electrically conductive coating.

The housing 10 has a base 11 through which the electrical conductor 6 is passed, which can be connected to ground potential via a screw connection 12. The base 11 is designed such that it flexes when an increased pressure of a specific magnitude occurs within the housing 10, and thus relieves the interior of the housing from overpressure.

The active part is surrounded by a dielectric sleeve 13 which ensures the insulation from the wall of the housing 10 which can be grounded. Elastic dielectrics, for example silicones, may preferably be used as the material for the sleeve. During the production of the surge arrester, this material can first of all be poured in the liquid state into the housing 10 which already accommodates the preassembled active part 8 and the electrical conductors 3 and 6, and can then be polymerized forming the preferably elastic sleeve 13 in the housing 10. Dielectrically undesirable gaps or pores in the area where the field load is high between the suppressor active part 8 and the dielectric sleeve 13 are avoided by coating the active part 8 with an adhesion promoter. Any pores and/or gaps which nevertheless occur inside the housing between the active part 8 and the wall of the housing 10 can be filled with a gel-like dielectric, for example a silicone oil, preferably in a vacuum, in order to improve the dielectric strength.

The housing 10 is like a bottle and has a housing section 14 like a bottle neck, which is arranged symmetrically with respect to the axis z, and thus also with respect to the electrical conductor 3. There is a conically expanding housing section 15 adjacent to the housing section 14 in the form of a bottle neck, in which section 15 an end, which is connected to the connection fitting 1, of the electrical conductor 3, which is connected to the plug connection 5, is routed. The housing section 14 in the form of a bottle neck is swaged at its end facing the plug connection 5, forming an expanded area 16. Furthermore, the housing section 14 which is like a bottle neck has a mounting flange 17 and a compression spring 18, which is guided between the mounting flange 17 and the expanded area 16.

The bottle-shaped design of the housing 10 results in an electric field being formed inside the housing which makes it unnecessary to have any field-controlling, semiconductive and/or conductive elements and/or coatings between the active part 8 and the housing wall even if the active part 8 is not cylindrically symmetrical.

For assembly, the connection 5 is plugged into a connection, provided with an inner cone, of a metal-encapsulated switchgear assembly. The surge arrester is thus electrically connected to the switchgear assembly. The mounting flange 17 is then firmly connected to the encapsulation of the switchgear assembly, loading the compression spring 18. The surge arrester is then fixed in an elastically slightly sprung manner on the metal encapsulation of the switchgear assembly.

A section 19 of the dielectric sleeve 13 which is provided between the plug connection 5 and the expanded area 16 and is arranged outside the housing 10 produces the insulation between the electrical conductor 3, which carries high voltage, and the metal encapsulation of the switchgear assembly, the housing 10, and the mounting flange 17.

Although this invention has been illustrated and described in accordance with certain preferred embodiments, it is recognized that the scope of this invention is to be determined by the following claims.

What is claimed is:

1. A surge arrester comprising:

a cylindrically symmetrical housing which can be grounded, which is designed as a bottle and which has a housing portion in the form of a bottle neck and a conically expanding housing portion connecting the bottle neck to a wider cylindrical housing portion;

an active part which is arranged in the wide cylindrical housing portion, which is aligned along an axis of symmetry and has two connection fittings, at least one varistor element arranged between the two connection fittings and at least one loop which is mounted with its ends on the two connection fittings and which acts on the connection fittings and the at least one varistor element to form a contact force;

a plug connection member, which can be brought to a high-voltage potential and which includes a plug contact arranged outside of the cylindrically symmetrical housing and a cylindrically symmetrical electrical conductor, which conductor passes through the bottle neck and the conically expanding housing portion and connects the plug contact to one of the two connection fittings within the wide cylindrical housing portion; and a dielectric sleeve, which surrounds the active part and the cylindrically symmetrical electrical conductor and insulates the active part and the cylindrically symmetrical electrical conductor from the cylindrically symmetrical housing.

2. The surge arrester as claimed in claim 1, wherein the housing section which is in the form of a bottle neck is expanded at its end facing the plug connection.

3. The surge arrester as claimed in claim 2, wherein a mounting flange and a compression spring, which is arranged between the mounting flange and the expanded area, are guided on the housing section in the form of a bottle neck.

4. The surge arrester as claimed in claim 1, wherein the base of the housing which is in the form of a bottle is designed to be sensitive to increased pressure.

5. The surge arrester as claimed in claim 1, wherein the active part is coated with an adhesion promoter which acts on the dielectric sleeve.

6. The surge arrester as claimed in claim 1, wherein pores or gaps surrounded by the housing and contained in the dielectric sleeve or between the dielectric sleeve and a wall of the housing and the arrester active part are filled with a gel-like dielectric.

7. A surge arrester, comprising:

a cylindrically symmetrical housing, said housing having first and second housing portions, said first housing portion being wider than said second housing portion;

an active part arranged in said cylindrically symmetrical housing, said active part being aligned along an axis of symmetry and having two connection fittings;

at least one varistor element arranged between said two connection fittings;

a plug connection member, which can be brought to a high-voltage potential and which includes a plug contact arranged outside of the cylindrically symmetrical housing and a cylindrically symmetrical electrical conductor, which conductor passes through the second housing portion and connects the plug contact to one of the two connection fittings within the first cylindrical housing portion;

a tensioning apparatus which acts on the connection fittings and the at least one varistor element to form a contact force, said tensioning apparatus having at least one loop which is mounted at its ends on said two connection fittings; and a dielectric sleeve surrounding said active part.

8. The surge arrester as claimed in claim 7, wherein a conically expanding housing portion is disposed between said first housing portion and said second housing portion.

9. The surge arrester as claimed in claim 8, wherein the second housing portion includes an expanded area at an end adjacent said plug connection.

10. The surge arrester of claim 9, wherein a mounting flange and a compression spring are disposed on the second housing portion.

11. The surge arrester of claim 10, wherein said compression spring is disposed between said mounting flange and said expanded area of said second housing portion.

12. The surge arrester of claim 7, wherein a base of said housing is sensitive to increased pressure.

13. The surge arrester as claimed in claim 7, wherein the active part is coated with an adhesion promoter which acts on the dielectric sleeve.

14. The surge arrester as claimed in claim 7, wherein pores or gaps surrounded by the housing and contained in the dielectric sleeve or between the dielectric sleeve and a wall of the housing and the active part are filled with a gel-like dielectric.

15. A surge arrester, comprising:

a cylindrically symmetrical housing, said housing having first, second, and third housing portions, said first housing portion being wider than said second housing portion and said third housing portion being conical in shape and disposed between said first housing portion and said second housing portion;

an active part arranged in said housing, said active part being aligned along an axis of symmetry and having two connection fittings;

at least one varistor element arranged between said two connection fittings;

a plug connection member, which can be brought to a high-voltage potential and which includes a plug contact arranged outside of the cylindrically symmetrical housing and a cylindrically symmetrical electrical conductor, which conductor passes through the second and third housing portions and connects the plug contact to one of the two connection fittings within the first cylindrical housing portion;

a tensioning apparatus which acts on the connection fittings and the at least one varistor element to form a contact force, said tensioning apparatus having at least one loop which is mounted at its ends on said two connection fittings; and a dielectric sleeve surrounding said active part.

* * * * *